(12) United States Patent  
Smith (10) Patent No.: US 7,379,241 B2  
(45) Date of Patent: May 27, 2008

(54) HIGH EFFICIENCY PHASE GRATING HAVING A PLANAR REFLECTOR

(75) Inventor: Malcolm C. Smith, Winchester, MA (US)

(73) Assignee: Polychromix Corporation, Wilmington, MA (US)

( * ) Notice: Subject to any disclaimer, the term of this patent is extended or adjusted under 35 U.S.C. 154(b) by 0 days.

(21) Appl. No.: 11/296,890

(22) Filed: Dec. 8, 2005

(65) Prior Publication Data

US 2006/0152809 A1 Jul. 13, 2006

Related U.S. Application Data

(60) Provisional application No. 60/636,692, filed on Dec. 15, 2004.

(51) Int. Cl.
*G02B 5/30* (2006.01)
(52) U.S. Cl. .................. 359/486; 359/572; 359/576

(58) Field of Classification Search ............... None
See application file for complete search history.

(56) References Cited

U.S. PATENT DOCUMENTS

2005/0045799 A1* 3/2005 Deng et al. ............... 250/200
2005/0231806 A1* 10/2005 Barton et al. ............... 359/566

* cited by examiner

*Primary Examiner*—Stephone B. Allen
*Assistant Examiner*—Lee Fineman
(74) *Attorney, Agent, or Firm*—Lowrie, Lando & Anastasi, LLP (57) ABSTRACT

An apparatus for processing electromagnetic radiation. The apparatus comprises a dielectric reflector, a plurality of ridges disposed on the dielectric reflector and a plurality of grooves disposed intermediate adjacent ridges to form a diffraction grating. Each of the ridges comprises a first dielectric material disposed on the dielectric reflector having a first index of refraction and a second dielectric material, having a second index of refraction different than the first index of refraction, disposed on the first dielectric material.

6 Claims, 7 Drawing Sheets

HIGH EFFICIENCY PHASE GRATING HAVING A PLANAR REFLECTOR

RELATED APPLICATIONS

This application claims priority under 35 U.S.C. § 119(e) to U.S. Provisional Application Ser. No. 60/636,692, entitled "High Efficiency Phase Grate Having a Planar Reflector," filed on Dec. 15, 2004, which is herein incorporated by reference in its entirety.

FEDERALLY SPONSORED RESEARCH

This invention was made with Government support under NSF SBIR Phase-Two Grant No. DMI-0420331. The Government may have certain rights to this invention.

BACKGROUND OF INVENTION

1. Field of Invention

The present invention relates in general to free-space, diffraction gratings, and more particularly to free-space, diffraction gratings having a high throughput efficiency.

2. Discussion of Related Art

Diffractive elements are used in many application areas to spatially separate the component wavelengths of polychromatic light. For example, in telecommunications applications, diffractive elements may be used to spatially separate the channels of a wavelength division multiplexed (WDM) signal for subsequent processing (e.g., gain equalization or switching). Examples of diffractive elements for achieving spatial separation, include fiber Bragg gratings (FBG), and reflective and transmissive free-space diffraction gratings. Each of these diffractive elements offers performance advantages and disadvantages. A diffractive element's suitability for a specific application is dependent on characteristics such as throughput efficiency, dispersion, polarization-dependent loss (PDL), as well as the diffrative element's size, manufacturability, expense, and sensitivity to environmental conditions. Free-space diffraction gratings are referred to herein below as diffraction gratings or simply as gratings.

As is well known, reflective diffraction gratings are typically comprised of a reflective surface having a plurality of spatially-separated, reflective ridges and intervening grooves that induce a spatial, periodic phase delay on a wavefront of a beam of light incident thereon. The phase delay causes diffraction of the beam of light and angularly separates the beam into its component wavelengths of light. Conventional reflective, free-space diffraction gratings offer unique characteristics that make them suitable for many applications. However, as discussed below, they have performance shortcomings.

Also as is well known, transmissive diffraction gratings are typically comprised of a transmissive substrate having a plurality of spatially-separated, transmissive ridges and intervening grooves that induce a spatial, periodic phase delay on a wavefront of a beam of light. The phase delay causes diffraction of the beam of light and angularly separates the beam into its component wavelengths of light. Similar to conventional reflective diffraction grating, conventional free-space transmissive diffraction gratings offer unique characteristics that make them suitable for many applications. However, as discussed below, they have performance shortcomings.

The term "throughput efficiency" is defined herein to mean the logarithm of the ratio of the useable portion of the output optical power to the total optical power incident on the diffraction grating. In many applications, the useable portion of the output power corresponds to a single diffraction order. This diffraction order is referred to herein as the diffraction order of interest. A high throughput efficiency typically means greater than approximately 85%.

In telecommunications applications, the use of optical processing elements, such as gratings, having higher throughput efficiencies often results in a reduced need for amplifiers to boost a transmitted signal. Further, in many systems, a signal is first demultiplexed by a grating and then re-multiplexed by the grating. In such systems, the desirability of gratings having high throughput efficiency is compounded by the fact that the effects of low throughput efficiency are doubled.

The term "Polarization Dependent Loss" (PDL) is defined herein to mean the logarithm of the ratio of the throughput efficiency of the TE-polarized portion light (expressed in power) to the throughput efficiency of the TM-polarized light (expressed in power). In many systems, unpolarized light is incident upon a grating. In such systems it is typically desirable that the transmission of light by the system be independent of polarization so as to avoid producing a polarized output (i.e., it is desirable that the PDL be as near to zero as possible). However, conventional diffraction gratings typically transmit light in a highly polarization-dependent manner, particularly when they provide a high dispersion.

The term "angular dispersion" is defined herein to mean a variation of the wavelength of light as a function of angle. For example, processing of a polychromatic signal by a diffraction grating gives rise to a corresponding dispersion. Dispersion by free-space reflective diffraction gratings may be characterized using the well known grating equation, $$\sin(\theta_m) = \sin(\theta_i) + m\frac{\lambda}{\Lambda} \qquad (1)$$

where $\theta_i$ is the angle of the incident beam with respect to the grating normal, m indicates a diffractive order, $\theta_m$ is the angle of the $m^{th}$ diffractive order with respect to the grating normal, $\lambda$ is the wavelength of the light, and $\Lambda$ is the period of the grating.

More particularly, for a plurality of wavelengths incident on a diffraction grating at a single angle, angular dispersion is given by the equation, $$\frac{d\theta_m}{d\lambda} = \frac{m}{\Lambda\cos\theta_m} \qquad (2)$$

The term "linear dispersion" is defined as the product of angular dispersion and a selected length. Devices that process the spatially-separated channels of a WDM signal typically require a specific linear dispersion. Accordingly, it is typically desirable to have angular dispersion be as large as possible to minimize the length necessary to achieve a given amount of linear separation. As used herein below, the term "dispersion" used alone refers to angular dispersion.

For example, conventional design techniques may be used to produce diffraction gratings selected to provide a suitable throughput efficiency, dispersion, and PDL for a particular application. However, in many instances, a conventional grating made according to those techniques is not capable of producing suitable amounts of each. For example, a free-space metal reflective grating designed to have a grating frequency of 1800 lines/mm is known to have a 90% throughput efficiency for TM-polarized light in a wavelength range of 0.8 to 0.9 μm. However, the efficiency of the TE-polarized light in this wavelength range is below 50%.

A free-space metal reflective diffraction gratings designed to have a 1800 lines/mm grating frequency also provide high throughput efficiency for TE-polarized light in a very narrow band around λ=0.5 μm; however, the throughput efficiency for TM-polarized light in this wavelength range is below 50% (see pg. 78 of Diffraction Gratings and Applications, by Loewen, published by Marcel and Dekker, 1997). Additionally, conventional free-space gratings may be selected to provide high efficiency for both TE-polarized and TM-polarized light in a selected wavelength range; however, the dispersion in the selected range is low.

While reflective and transmissive gratings designed using conventional techniques may provide appropriate throughput efficiency, dispersion or PDL for some applications, there remains a need for grating elements providing appropriate combinations of each characteristic, as well as having an appropriate size, manufacturability, and expense.

SUMMARY OF INVENTION

Exemplary aspects of the invention are directed to diffraction gratings having ridges comprising at least two dielectric materials. The dielectric materials are selected to have different indexes of refraction than one another and for each material, a shape (including but not limited to a thickness) and index of refraction may be selected to affect the electromagnetic characteristics of the grating to achieve a relatively high throughput efficiency and/or low PDL.

Additional exemplary aspects of the present invention apply a recognition that reflective diffraction gratings that include metal surfaces provide loss mechanisms that decrease a throughput efficiency of the gratings due, at least in part, to absorption of light energy by the metal. In gratings having corrugated metal surfaces, such loss mechanisms, include losses resulting from plasmon-polariton surface waves (PPSW).

Further exemplary aspects of the invention are directed to the use of an overcoat layer disposed on a grating of selected thickness, and having a shape and index of refraction selected to tune the electromagnetic characteristics of the grating to achieve relatively high throughput efficiency and low PDL.

In some embodiments of diffraction gratings according to the above aspects, one or more of the overcoat layer and the ridges are designed to provide greater than 95% throughput efficiency for TE-polarized light and/or 95% throughput efficiency for TM-polarized light, the resulting diffraction grating having less than 0.2 dB of PDL. In some embodiments according to the above aspects, a throughput efficiency for TE-polarized light of greater than 99% and/or a throughput efficiency for TM-polarized light of greater than 99%, the resulting diffraction grating having less than 0.05 dB of PDL.

A first aspect of the invention is directed to an apparatus for processing electromagnetic radiation, comprising a dielectric reflector, and a plurality of ridges disposed on the dielectric reflector and a plurality of grooves disposed intermediate adjacent ridges to form a diffraction grating, each of said ridges comprising a first dielectric material disposed on the dielectric reflector having a first index of refraction and a second dielectric material having a second index of refraction different than the first index of refraction disposed on the first dielectric material. In some embodiments, the first dielectric material and the second dielectric material are absent from the grooves.

Another aspect of the invention is directed to an apparatus for processing electromagnetic radiation, the electromagnetic radiation having a TM-polarized portion and a TE-polarized portion, comprising a transparent substrate, and a plurality of ridges disposed on the substrate and a plurality of grooves disposed intermediate adjacent ridges to form a diffraction grating, each of said ridges comprising a first dielectric material disposed on the substrate having a first index of refraction, and a second dielectric material, having a second index of refraction different than the first index of refraction disposed on the first dielectric material, the diffraction grating being adapted such that the zeroth diffraction orders of the TM-polarized portion and the TE-polarized portion of the electromagnetic radiation are substantially canceled by destructive interference for an angle of incidence of the radiation on the diffraction grating.

Still another aspect of the invention is directed to an apparatus for processing electromagnetic radiation, comprising a substrate, a plurality of ridges each having a top surface, said ridges being disposed on the substrate and a plurality of grooves disposed intermediate adjacent ridges to form a diffraction grating, each of said ridges comprising a first dielectric material disposed on the substrate having a first index of refraction, and a second dielectric material having a second index of refraction different than the first index of refraction disposed on the first dielectric material, and an overcoat layer having a planar surface that is coplanar with the top surfaces of said ridges.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of the terms "including," "comprising," "having," "containing," "involving," and variations thereof herein, is meant to encompass the items listed thereafter and equivalents thereof as well as additional items.

A first aspect of the present invention is directed to an apparatus for processing electromagnetic radiation, comprising a dielectric reflector, a plurality of ridges disposed on the dielectric reflector and a plurality of grooves disposed intermediate adjacent ridges to form a diffraction grating, each of the ridges comprising a first dielectric material disposed on the dielectric reflector having a first index of refraction, and a second dielectric material having a second index of refraction different than the first index of refraction disposed on the first dielectric material. Such an apparatus construction permits a designer to select shape(s) (including thicknesses) and indexes of refraction of the first and/or second dielectric materials to affect the electromagnetic characteristics of the grating to achieve a grating having relatively high throughput efficiency. In some embodiments, by selecting the materials and shapes of the dielectric materials, a grating having an improved throughput efficiency and/or lower PDL relative to grating having a single dielectric material may be achieved. In some embodiments the first and/or second dielectric materials form planar layers. In some embodiments of diffraction gratings according to the above aspect, one or more overcoat layers may be provided over the first and second dielectric materials that comprise the ridges. In such embodiments, the ridges and overcoat can be designed to provide greater than 95% throughput for TE-polarized light and/or TM-polarized light and less than 0.2 dB of PDL. In some embodiments, greater than 99% throughput for TE-polarized light and/or TM-polarized light and less than 0.05 dB of PDL is provided.

Figure 1A:
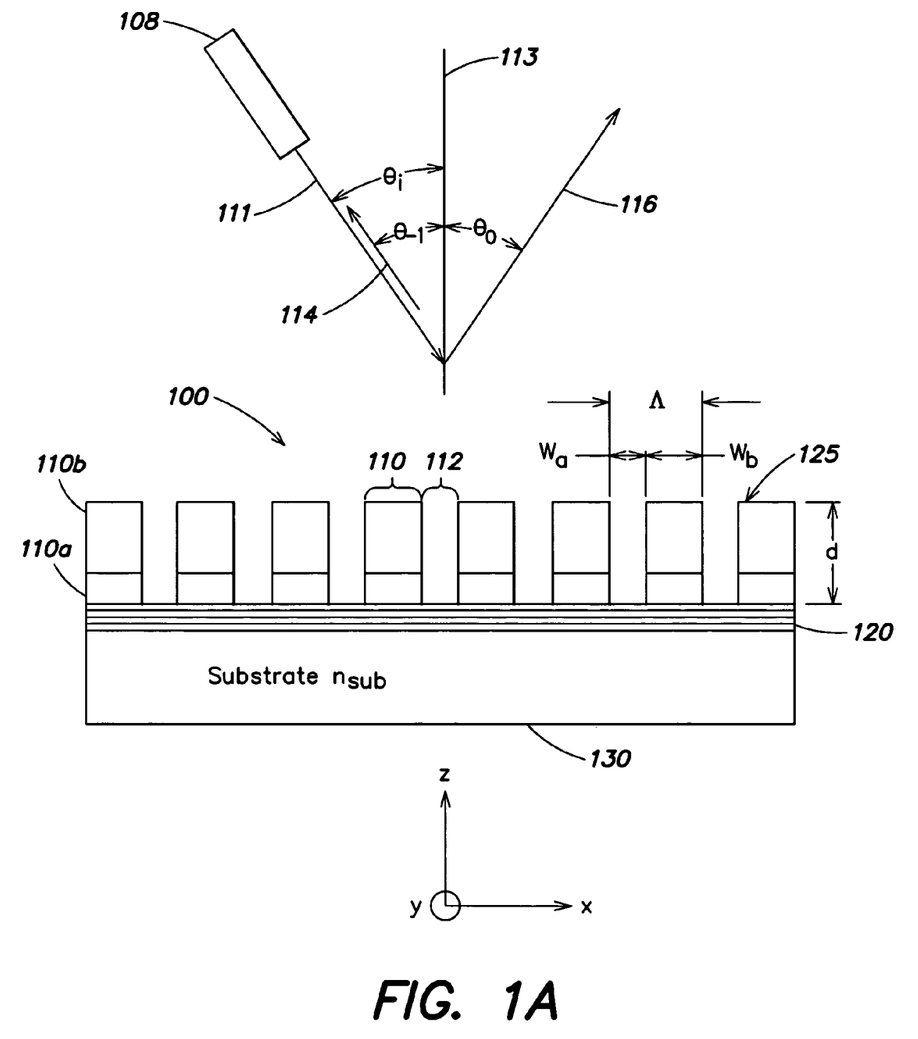
FIG. 1A is a cross-sectional side view of an embodiment of a diffractive optical system according to an aspect of the invention.

FIG. 1A is a cross-sectional side view of an embodiment of a diffractive optical system 100 according to an aspect of the invention. As illustrated, light from an electromagnetic source 108 can be projected onto a phase grating 125 of the diffractive optical system. The phase grating includes a plurality of ridges 110 disposed on a dielectric reflector 120 and a plurality of grooves 112 formed between the ridges. The ridges and grooves are disposed in an alternating pattern to form the phase grating.

The grating 125 has a period $\Lambda$, and a grating thickness of d. The grooves and ridges have widths of $w_a$ and $w_b$, respectively and fill factors of $F_a = w_a/\Lambda$ and $F_b = w_b/\Lambda$, respectively. For electromagnetic radiation having a wavelength $\lambda$, the first order Littrow angle of phase grating 125 is given by the following equation.

$$\theta_L = \sin^{-1}\frac{\lambda}{2n_s\Lambda} \quad (3)$$

It is to be appreciated that FIG. 1A illustrates a representative portion of a grating. Gratings according to aspects of the present invention may have any suitable number of grooves and ridges. Optionally, a substrate 130 may be included. While, the illustrated grating has a single period $\Lambda$, it may be possible to apply principles of the present invention to gratings having a plurality of periods, such as chirped gratings.

Figure 1B:
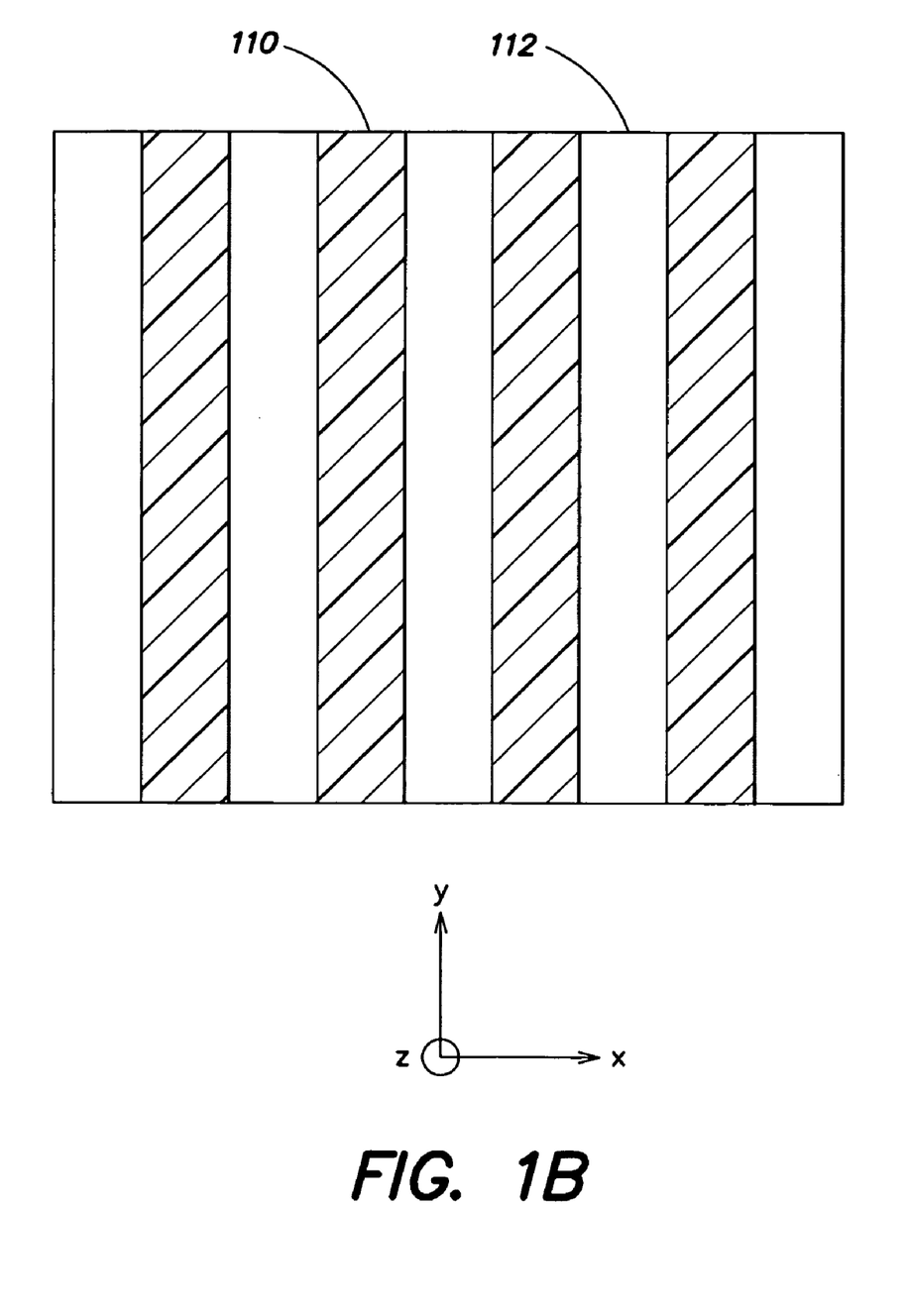
FIG. 1B is a top view of the grating shown in FIG. 1A illustrating the elongate shape of ridges and grooves.

Grating 125 is characterized by coordinate axes x, y and z, where, the x-axis extends in the direction of the widths $w_b$ of ridges 110, the y-axis extends in the direction of the lengths of ridges 110, and the z-axis is normal to the plane formed by a top surface of reflector 120 (i.e., parallel to normal 113). FIG. 1B is a top view of grating 125 illustrating the elongate shape of ridges 110 and grooves 112.

Referring again to FIG. 1A, source 108 may be any suitable electromagnetic source having one or more wavelengths of light $\lambda_1 \ldots \lambda_i$. For example, source 108 may be a broadband source, a single laser, or a plurality of lasers, or may be fiber optic carrying one or more discrete wavelengths of light (e.g., the channels of a WDM signal). The term "light" is not intended to be limiting to visible wavelength bands, and light refers to any suitable wavelength of electromagnetic radiation.

Light from source 108, having one or more wavelengths $\lambda_1 \ldots \lambda_i$ is incident on the grating at an angle of incidence $\theta_i$ with a normal 113 to a surface of reflector 120. For example, the one or more wavelengths may be equally spaced wavelengths of a telecommunications device operating, for example, in the C-band. In some embodiments, source 108 and grating 125 are located to achieve a Littrow condition (e.g., the minus-first diffractive order 114 reflects substantially back over the incident beam of light 111). In the illustrated embodiment, all wavelengths $\lambda_1 \ldots \lambda_i$ are assumed to be incident on grating at angle $\theta_i$; however, the invention is not so limited and each wavelength may be incident at a distinct angle.

In some embodiments, source 108 and grating 125 can be located such that only the zeroth diffraction order 116 (i.e., specularly reflected light) and minus-first order 114 are physically possible. That is, wavelengths $\lambda_1 \ldots \lambda_i$, period $\Lambda$ of grating 125, and angle of incidence $\theta_i$ are selected such that the remaining orders are physically incapable of existing (i.e., they are precluded because they correspond to diffraction angles $\theta_m$ greater than 90 degrees from normal 113). In some embodiments, it is preferable that all of the wavelengths in the plus-first order are precluded (i.e., all wavelengths projected from source 108 are precluded from the plus-first order). The zeroth diffraction order 116 and minus-first order 114 are generated at angles $\theta_0$ and $\theta_{-1}$ with respect to normal 113, respectively.

In grating 125, the ridges are comprised of a first dielectric material 110a (also referred to herein as the bottom layer of the ridges) having a first index of refraction $n_a$ disposed on dielectric reflector 120, and a second dielectric material 110b (also referred to herein as the top layer of the ridges) having a second index of refraction $n_b$ disposed on the first dielectric material. First dielectric material 110a and second dielectric material 110b are selected to have different indices of refraction. Preferably, the first material and the second material are highly transparent to light at the operative wavelengths. Additionally, in some embodiments, the first and second materials have a substantially uniform index of refraction along the x and y directions.

In some embodiments, the first dielectric material has an index of refraction of less than 1.6 at 1.55 micrometers. For example, the first dielectric material may be $Al_2O_3$ or silica. In some embodiments, the second dielectric material has an index of refraction of greater than 1.8 at a wavelength of 1.55 micrometers. For example, the second dielectric material may be $Ta_2O_5$, $TiO_2$ or $ZrO_2$.

Typically, second material 110b has a higher index of refraction than first material 110a. However, the invention is not so limited and, in some embodiments, first dielectric material 110a may have a higher index of refraction than second dielectric material 1110b.

It is to be appreciated that the dielectric materials comprising the ridges need not form uniform layers of material, and the number of dielectric materials in the ridges is not meant to be limited. In fact, the phase grating elements may be made up of a graded index structure along the z direction such that the index of refraction changes substantially continuously in the z direction, which for the purpose of the present application corresponds to a high number of dielectric materials.

It is also to be appreciated that the term "grooves" as used herein refers to the regions disposed between consecutive ridges. The grooves may be formed by any suitable technique, for example, grooves may be formed as a result of a deposition of material forming the grooves, by removal of material that forms the ridges, or simply by the absence of material comprising the ridges. Grooves 112 may be comprised of one or more materials including air or any other suitable dielectric material. The dielectric comprising the grooves may be a gas (including ambient air), a liquid, or a solid dielectric material. For example, the solid may have an index of refraction close to 1.0. An example of a suitable solid is sol gel (index of refraction approximately equal to 1.1). In some embodiments, the first material and/or the second material comprising the ridges are completely absent from the grooves.

Dielectric reflector 120 may be any suitable dielectric reflector as is known in the art or is later developed. For example, dielectric reflector 120 may be comprised of alternating layers of dielectric materials selected to form a conventional quarter-wave stack. The dielectric layer may have any suitable number of layers. Typically, a reflector is selected to have a thickness to prevent any interaction by light projected onto the grating, with any substrate on which the reflector may be disposed. It is to be appreciated that, in some embodiments the ridges comprise dielectric materials and the reflector comprises dielectric materials. Accordingly, due to the use of only dielectric materials in the optically significant portions of the grating, light incident on the grating does not interact with any metal. In such embodiments, the loss mechanisms associated with metal, such as the loss mechanisms discussed above, are eliminated.

It is to be appreciated that the grating (i.e., the ridges and grooves) need not be intimately connected to the dielectric reflector. A gap may exist between the grating and the reflector, for example, as a result of an adhesive being positioned to adhere the grating and the reflector together. Typically, any such gap would be less than one-tenth of the wavelength of the shortest operative wavelength.

As discussed above, in some embodiments, the dielectric reflector is disposed on a substrate 130. Any suitable substrate material may be used. Typically, a substrate is selected such that the dielectric reflector can be suitably deposited on or otherwise adhered to the substrate. Typically, a substrate is selected to have suitable rigidity and thermal stability. In some embodiments, it may be desirable to have a temperature-independent grating. In such embodiments, the substrate and superstrate materials may comprise low coefficient of thermal expansion materials such as Corning ULE®. ULE is a clear, glassy material having an index of refraction of 1.48 for visible light.

In some embodiments, the shapes of the ridges 110 and grooves 112 are selected such that the zeroth diffraction order (i.e., the specularly reflected portion of the TM-polarized light and/or the TE-polarized light) destructively interferes in the far field of the grating (i.e., the TE-polarized light and/or the TM-polarized light in the zeroth order are suppressed). While full suppression is preferable, there may be some residual radiation, for example, for certain wavelengths of light from source 108, due to the light having a finite bandwidth.

It is to be appreciated that, in addition to suppressing light in the zeroth order, the grating and source can be designed and arranged such that all orders of diffraction other than the zeroth order and the minus-first order are physically incapable of existing as described above. Accordingly, for such embodiments because the zeroth diffraction order and the minus-first diffraction order are the only diffraction orders capable of existing, and because the zeroth diffraction order is suppressed by destructive interference, a high throughput efficiency can be achieved for the TE-polarized light and the TM-polarized light in the minus-first diffractive order.

For example, a grating may be designed to suppress the zeroth diffraction order for only a single wavelength (e.g., the middle of the finite bandwidth). In such systems, for a suitably small band of wavelengths in proximity of the single wavelength, the zeroth diffraction order of light of other wavelengths incident on grating 125 is reduced to a high degree. In some embodiments, the grating can be selected to suppress light having a wavelength near the middle of the wavelengths $\lambda_1 \ldots \lambda_i$ incident on grating 125.

The design of a selected embodiment of a diffraction grating according to the invention may be achieved, for example, with the assistance of a design program providing grating efficiency computations. Such a program may be used to select the shapes and indexes of refractions of the materials comprising the ridges and/or grooves and the shapes and indexes of the reflector to achieve a high throughput efficiency and low PDL. For example, a program that is based on rigorous coupled-wave approximation (RCWA) may be used. One example of a program capable of performing suitable calculations is "gsolver" produced by Grating Solver Development Company of Allen, Tex. However, any other suitable computational methods may be used, such as the coupled-wave formalism described by Kaushik [J. Opt. Soc. Am. A, vol. 14 no. 3, p. 596 (1997)]. In particular, it is to be appreciated that the materials of the ridges and/or grooves and/or reflector as described above, permit added design parameters relative to conventional gratings such that the parameters can be selected to achieve a selected high throughput efficiency and low PDL.

In the embodiment illustrated in FIG. 1A, grating 125 is a lamellar grating (i.e., the grooves and ridges have a rectangular cross section). However, aspects of the invention are discussed with reference to a lamellar grating structure merely to facilitate description, and it is to be appreciated that the invention is not so limited. For example, gratings having ridges and/or grooves of any suitable cross-section, such as trapezoidal or rounded (e.g., sinusoidal), may be designed.

It is to be appreciated that gratings according to aspects of the present invention may be used in any suitable applications where a fixed (i.e., non-actuatable) grating is implemented (e.g., telecommunications systems and spectroscopic applications). The following is a list of exemplary telecommunications systems employing fixed grating: blockers, equalizers, adders/droppers, and multiplexer/demultiplexers. Examples of equalizers employing fixed gratings, in which a grating according to aspects of the present invention may be substituted, are described in U.S. application Ser. No. 10/446,299, titled TELECOMMUNICATIONS OPTICAL PROCESSOR, by Smith et al., filed May 28, 2003 (see for example FIGS. 1 and 2 of said application). The substance of said application is hereby incorporated by reference in its entirety.

Another aspect of the present invention is directed to an apparatus for processing electromagnetic radiation, the radiation having a TM-polarized portion and a TE-polarized portion, comprising a transparent substrate, a plurality of ridges disposed on the substrate and a plurality of grooves disposed intermediate adjacent ridges to form a diffraction grating, each of said ridges comprising a first dielectric material disposed on the substrate having a first index of refraction, and a second dielectric material having a second index of refraction different than the first index of refraction disposed on the first dielectric material, the diffraction grating being adapted such that the zeroth diffraction orders of the TM-polarized portion and the TE-polarized portion of the radiation are substantially canceled by destructive interference for a selected angle of incidence of the radiation on the diffraction grating.

Figure 2:
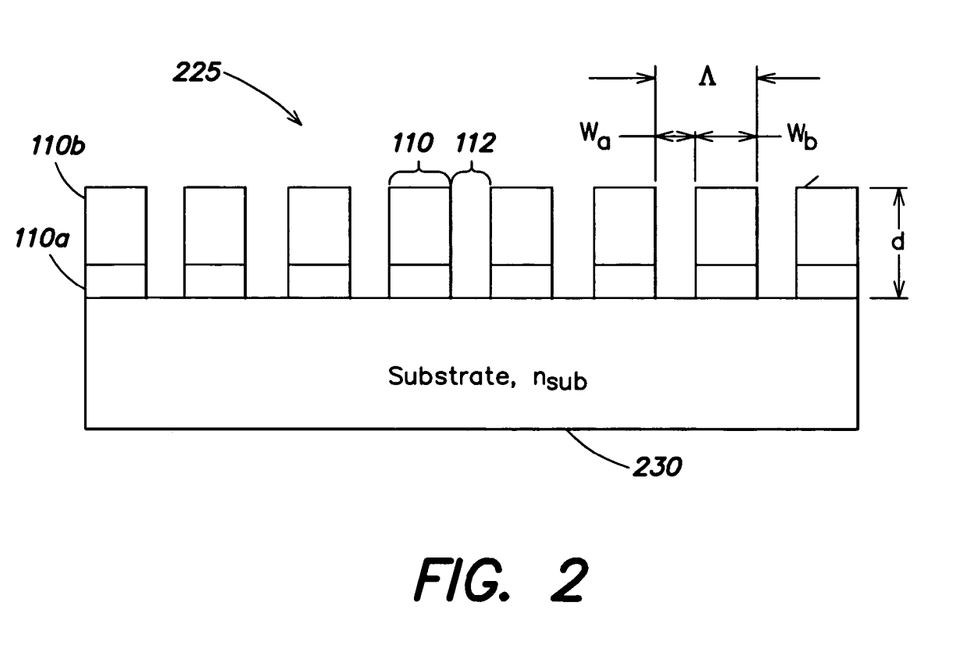
FIG. 2 is a cross-sectional side view of an example of a grating according to another aspect of the invention.

FIG. 2 is a cross-sectional side view of an example of a grating 225 according the above aspect of the invention. Grating 225 is a transmissive diffractive optical processor including ridges comprising a first dielectric material 110a and a second dielectric material 110b. The structure of grating 225 is substantially the same as apparatus 125 described above other than that reflector 120 is omitted and substrate 230 is selected to be at least partially transparent at the wavelengths of operation. Accordingly, to avoid obfuscation, discussion of similar elements will be omitted.

The substrate is typically selected to have a high transmission for the operative wavelength(s). The substrate is also typically selected to be thermally stable, and permit stable coupling of the grating to the substrate.

One of ordinary skill in the art would understand that unlike a reflective processor, a transmissive processor typically cannot limit the output from the grating to a single order of interest. For example, in some embodiments of the present invention, a transmission grating can be provided with a suitable grating frequency and arranged such that an input beam of light is incident at a selected angle, such that only minus-first and zeroth transmitted orders of light are physically possible, and only the minus-first and zeroth orders of reflected light are physically possible. Accordingly, it is to be appreciated that transmissive optical processors are generally less efficient than corresponding reflective gratings. However, according to principles of the present invention, a transmission grating having a relatively high throughput efficiency can be achieved. According to aspects of the present invention, shapes and indexes of the materials of the transmission grating may be selected to minimize both the transmissive zeroth order and the reflective zeroth order of the incident light, as well as the minus-first reflective order of the incident light, and as a result produce a transmissive grating having a relatively high throughput efficiency and low PDL for light in the minus-first transmissive order.

Similar to the design of the reflective grating discussed above, the design of a selected embodiment of a transmissive grating according to this aspect of the invention may be achieved, for example, with the assistance of a design program providing grating efficiency computations, such as "gsolver," to achieve a high throughput efficiency and low PDL by adjusting the shapes, positioning and indexes of refraction of the material comprising the ridges.

Another aspect of the present invention is directed to an apparatus for processing electromagnetic radiation, comprising a substrate, a plurality of ridges each having a top surface, the ridges being disposed on the substrate and a plurality of grooves disposed intermediate adjacent ridges to form a diffraction grating, each of said ridges comprising a first dielectric material disposed on the substrate having a first index of refraction, and a second dielectric material having a second index of refraction different than the first index of refraction disposed on the first dielectric material, and an overcoat layer having a planar surface that is coplanar with the top surfaces of said ridges.

Figure 3:
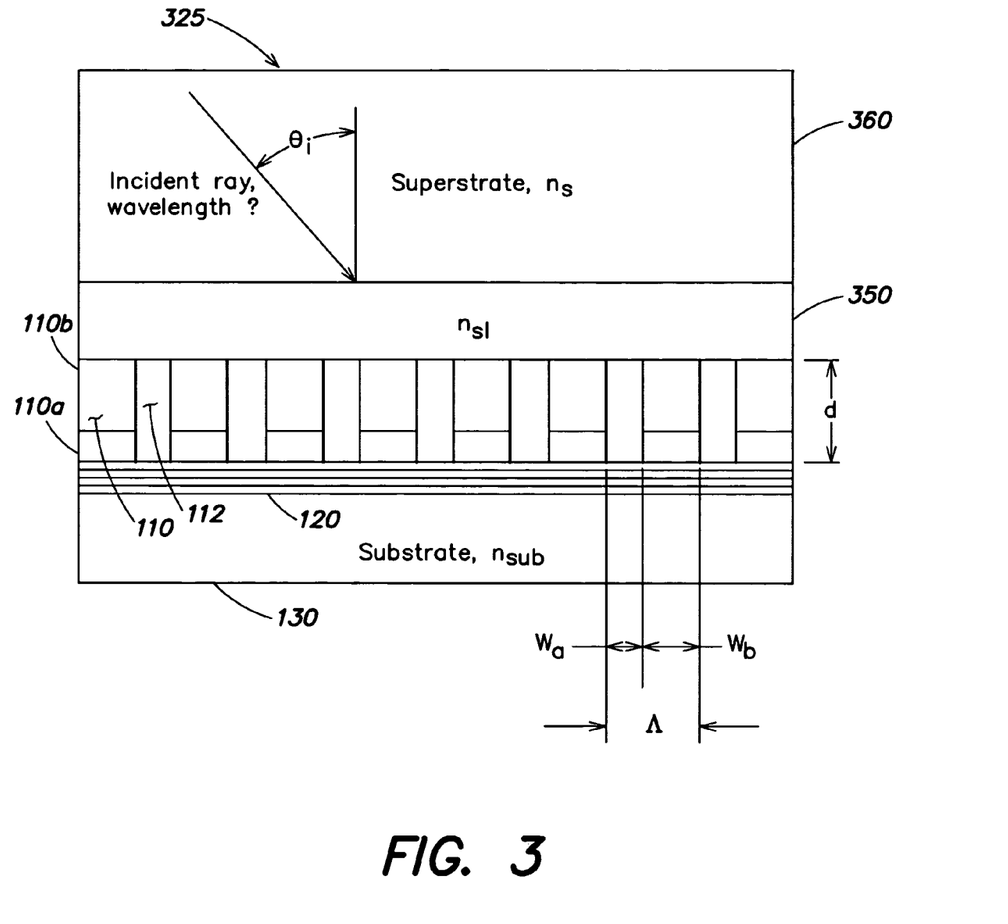
FIG. 3 is a cross-sectional side view of an example of an apparatus according to another aspect of the invention.

FIG. 3 is a cross-sectional side view of an example of an apparatus 325 according to this aspect of the invention. Apparatus 325 is a reflective diffraction grating. Apparatus 325 is a transmissive diffractive optical processor including ridges comprising a first dielectric material 110a and a second dielectric material 110b. Apparatus 325 is substantially the same as apparatus 125 described above other than an overcoat layer 350 is added. In addition, as discussed below, in some embodiments a superstrate layer may be added. Accordingly, to avoid obfuscation, discussion of similar elements will be omitted.

In some embodiments, a superstrate 360 is added to act as a support member for the entire structure. However, in some embodiments, the overcoat layer 350 provides support of the structure such that the superstrate may be omitted.

In the present embodiments, reflector 120 may be a planar metallic reflector or it may be a multilayer dielectric stack reflector as described above. As has been described herein, it is to be understood that the combination of design parameters, including refractive indexes, thicknesses and widths of ridges 110, grooves 112 and overcoat 350, can be selected to yield a high efficiency and low PDL characteristics of the device. According to some embodiments, the diffraction efficiency in both the TE and TM polarizations is greater than 95% with a PDL of less than 0.2 dB; and in some embodiments, the diffraction efficiency in both the TE and TM polarizations is greater than 99% with a PDL of less than 0.05 dB.

As described, above, the number of dielectrics in the various layers is not meant to be limited. The superstrate may also have additional dielectric materials.

The following is an exemplary embodiment of phase diffraction grating according to at least some aspects of the present invention, which were designed and tested using the "gsolver" software package for use in the wavelength range of 1525-1575 nm (known as the telecommunications C-band), projected at the Littrow angle.

EXAMPLE DESIGN

The grating has a grating period $\Lambda$ of 1.111 microns (900 lines/mm). The grating includes a superstrate of pure fused silica, having an index approximately $n_S$=1.444 in the C-band, and an overcoat layer of $Ta_2O_5$ with index $n_{S1}$=2.06 in the C-band. The grating comprises a plurality of ridges comprising two dielectric materials, in the form of layers having indexes of refraction of $n_a$=1.444 and $n_b$=2.06. The grooves are filled with air. The top layer of the phase grating is $Ta_2O_5$, with an index of 2.06 at a wavelength of 1.55 μm. The bottom phase grating material is $SiO_2$, $n_{b2}$=1.444 at a wavelength of 1.55 μm. The layer thicknesses are: overcoat layer equals 0.444 μm, upper phase grating layer equals 0.686 μm, and lower phase grating layer equal 0.294 μm. It is to be appreciated that the thickness of the superstrate layer does not affect the performance of the grating, and any suitable superstrate thickness may be chosen. For example, the substrate thickness may be selected to provide suitable rigidity of the grating. Fill factor $F_a$ for the grooves is 0.465 and fill factor $F_b$ for the ridges is 0.535.

It is to be appreciated that in the present example, the overcoat and the top layer of dielectric material are constructed of the same material. In such embodiments, it is a convenience that fewer layers are deposited during the fabrication process, as described in greater detail below.

The mirror layer comprises a quarter-wave stack, dielectric reflector. The dielectric stack reflector can be of any standard design. In this example, the dielectric stack comprises alternating layers of $TiO_2$ (n=2.17 and thickness 0.198 µm) and $SiO_2$ (n=1.444 and thickness 0.2975 µm) with 10 periods or a total of 20 layers.

The Littrow angle of the present exemplary grating is 28.9° in the overcoat layer, which corresponds to an angle of incidence on the top surface of the superstrate of 44.2°.

Figure 4:
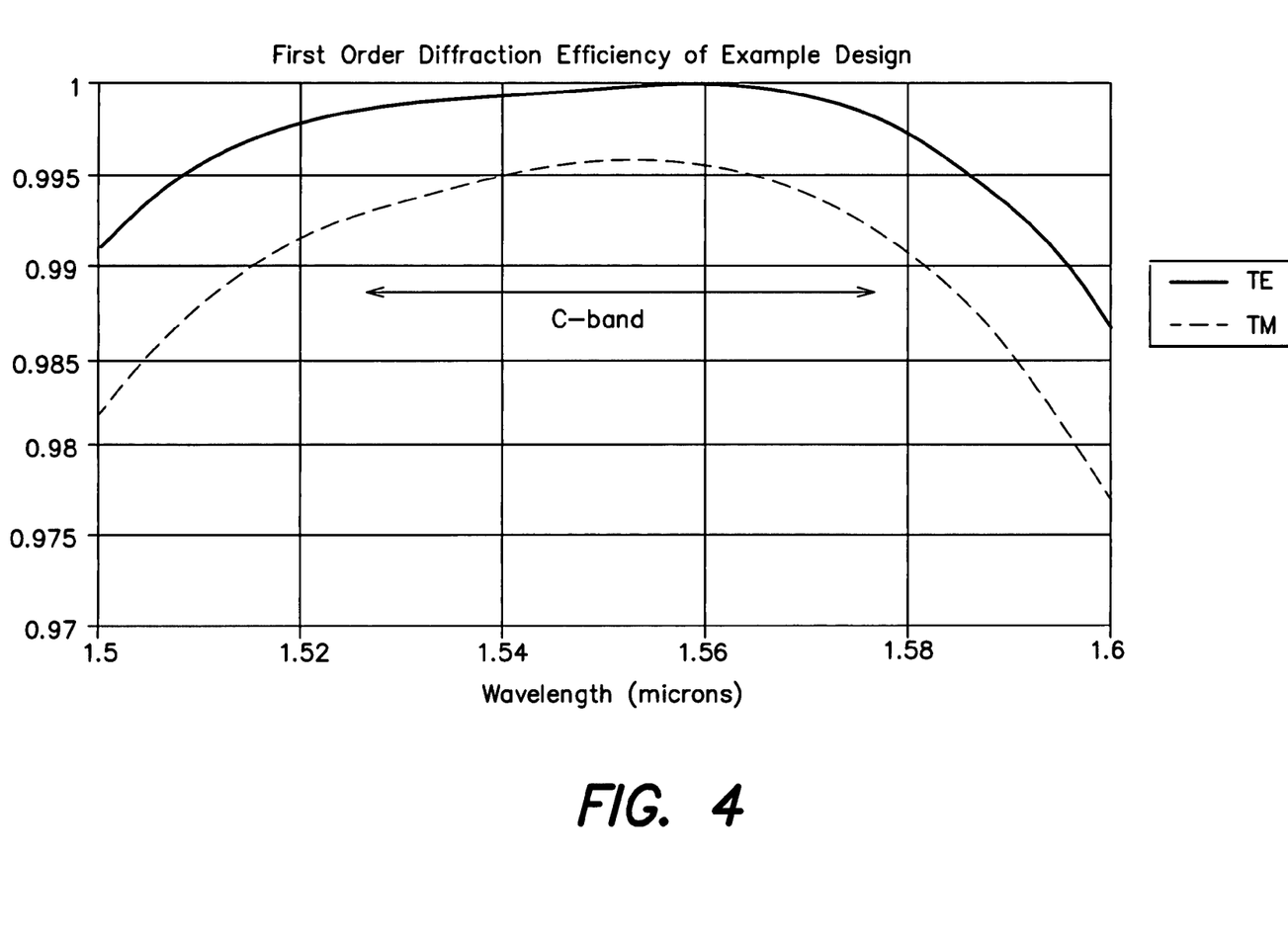
FIG. 4 is a graphical representation of computed efficiencies as a function of wavelength for light projected onto an exemplary embodiment of a diffraction grating for each of TE-polarized light and TM-polarized light.

FIG. 4 is a graphical representation of computed throughput efficiencies of the light projected onto the above exemplary embodiment of a diffraction grating at the Littrow angle, for each of TE-polarized light and TM-polarized light. The throughput efficiencies are presented as a function of wavelength. It is to be appreciated from FIG. 4, that the above exemplary embodiment produces greater than 99.0% first order diffraction efficiency in both polarizations (average efficiency>99.5%) with 0.02 dB of PDL across the entire communications C-band of 1525 to 1575 nm, as modeled with "gsolver."

EXAMPLE OF A MANUFACTURE PROCESS

FIG. 5A-5G illustrates steps corresponding to one example of a method of manufacture for the above example design. At a first step shown in FIG. 5A, a first silica plate 560 (corresponding to superstrate 360 in FIG. 3) is provided having a suitable flatness, thickness, and cleanliness to serve as a superstrate for the device. At a second step shown in FIG. 5B, a 1.13 µm first layer 510b of $Ta_2O_5$ is deposited on the substrate using conventional optical coating techniques. It is to be appreciated that, as discussed below, the layer 510b will be processed to form both the top material 110b (shown in FIG. 3) of the ridges of the diffraction grating and the overcoat layer 350 (also shown in FIG. 3). At a third step shown in FIG. 5C, a layer 510a of $SiO_2$ having a thickness of 0.294 µm is deposited on layer 510b. It is to be appreciated that layer 510a forms the lower material 110a of the ridges (shown in FIG. 3).

Figure 5A:
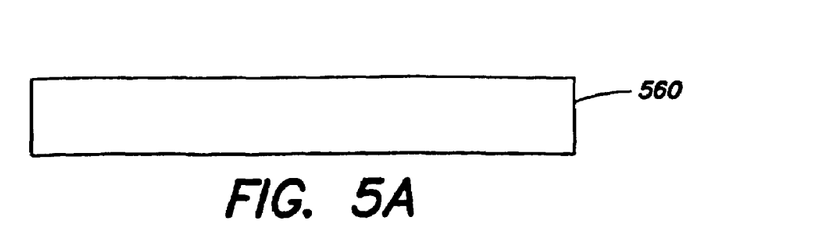
FIG. 5A-5G illustrate steps comprising one example of a method of manufacture for the above example design.
Figure 5B:
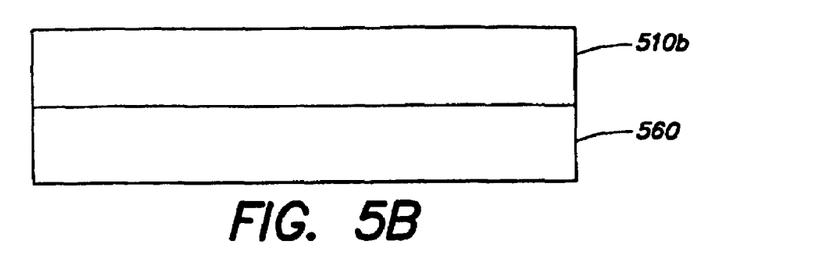
Figure 5C:
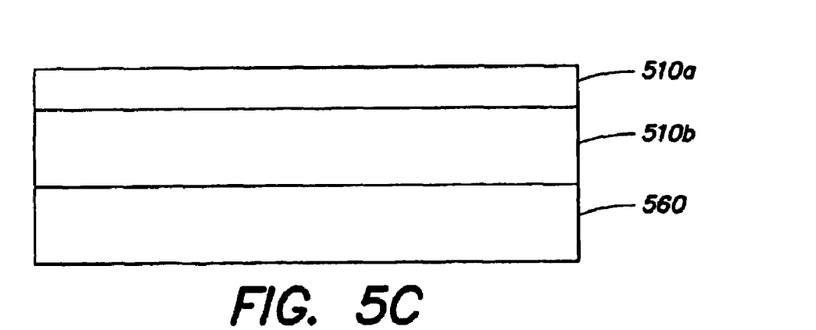
Figure 5D:
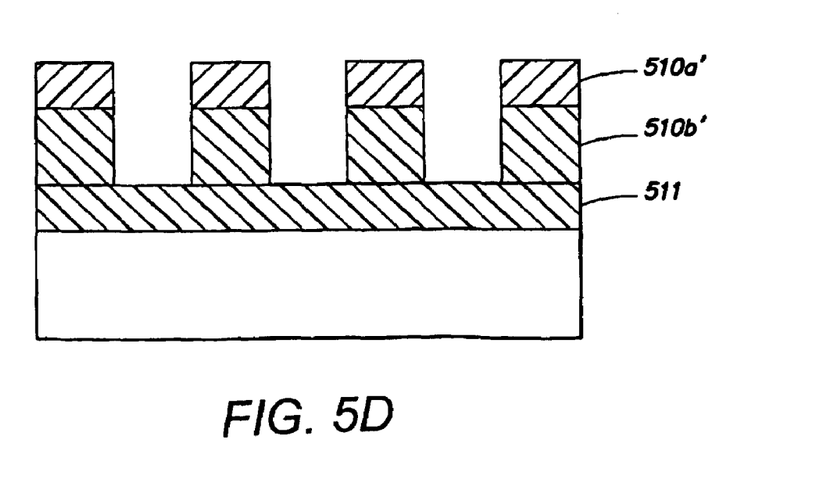

At a fourth step shown in FIG. 5D, layer 510b and layer 510a are processed to etch grooves to a depth of 0.980 µm at a 1.1111 µm period. After the etch step, layer 510a' is etched completely through to form the lower material 110a of the ridges, and layer 510b' is etched to a depth of 0.686 µm to form the upper material 110b of the grating. It is to be appreciated that the remaining unetched portion 511 of layer 510b forms the overcoat layer 350.

Figure 5E:
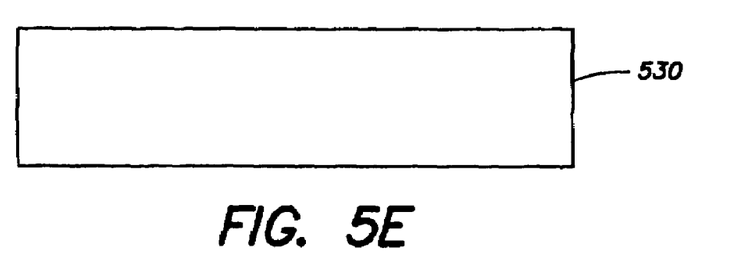
Figure 5F:
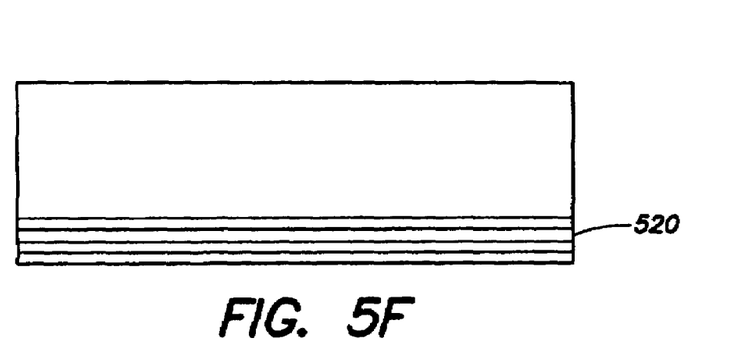

At a fifth step shown in FIG. 5E, a second silica plate 530 is provided having a suitable flatness, thickness, and cleanliness to serve as the substrate 130 for the device. At a sixth step shown in FIG. 5F, a multilayer dielectric stack mirror 520 (corresponding to reflector 120) is deposited on the second silica plate. The dielectric stack mirror comprises 10 alternating layers of each of $TiO_2$ and $SiO_2$.

Figure 5G:
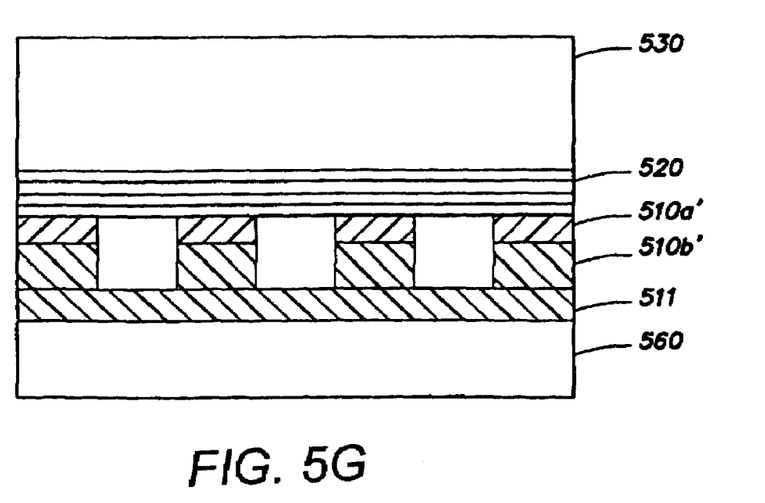

At a seventh step shown in FIG. 5G, etched layer 510a' (corresponding to bottom material 110a) is connected to the top layer of the dielectric mirror 520 (corresponding to reflector 120), for example, in a clean room environment. For example, an anodic bonding process or an adhesive disposed around the edge of the clear aperture of the grating, or a suitable mechanical clamping technique may be used to connect the dielectric mirror to the grating.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus for processing electromagnetic radiation, comprising:
    a substrate;
    a plurality of ridges each having a top surface, said ridges being disposed on the substrate and a plurality of grooves disposed intermediate adjacent ridges to form a diffraction grating, each of said ridges comprising a first dielectric material disposed on the substrate having a first index of refraction, and a second dielectric material having a second index of refraction different than the first index of refraction disposed on the first dielectric material; and
    an overcoat layer having a planar surface that is coplanar with the top surfaces of said ridges;
    wherein the diffraction grating is constructed and arranged such that the zeroth diffraction orders of a TM-polarized portion and a TE-polarized portion of the electromagnetic radiation are substantially canceled by destructive interference for an angle of incidence of the radiation on the diffraction grating.

2. The apparatus as claimed in claim 1, wherein the first dielectric material and the second dielectric material are absent from the grooves.

3. The apparatus as claimed in claim 1, wherein the substrate is a transparent substrate.

4. The apparatus as claimed in claim 1, wherein the substrate comprises a dielectric reflector.

5. The apparatus as claimed in claim 4, wherein the dielectric reflector comprises a dielectric stack mirror.

6. The apparatus as claimed in claim 5, wherein the dielectric stack mirror comprises alternating layers of $TiO_2$ and $SiO_2$.

* * * * *